(12) United States Patent
Rieger et al.

(10) Patent No.: US 11,073,616 B2
(45) Date of Patent: Jul. 27, 2021

(54) LASER SCANNER

(71) Applicant: RIEGL LASER MEASUREMENT SYSTEMS GMBH, Horn (AT)

(72) Inventors: Peter Rieger, Grossau (AT); Andreas Ullrich, Gablitz (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 446 days.

(21) Appl. No.: 16/093,693

(22) PCT Filed: Feb. 3, 2017

(86) PCT No.: PCT/AT2017/060015
§ 371 (c)(1),
(2) Date: Oct. 15, 2018

(87) PCT Pub. No.: WO2017/177246
PCT Pub. Date: Oct. 19, 2017

(65) Prior Publication Data
US 2019/0137625 A1    May 9, 2019

(30) Foreign Application Priority Data

Apr. 15, 2016 (AT) .............................. A 50334/2016

(51) Int. Cl.
*G01S 17/42* (2006.01)
*G01S 17/89* (2020.01)
(Continued)

(52) U.S. Cl.
CPC ................ *G01S 17/42* (2013.01); *G01C 7/02* (2013.01); *G01S 7/4808* (2013.01);
(Continued)

(58) Field of Classification Search
None
See application file for complete search history.

(56) References Cited

U.S. PATENT DOCUMENTS 3,719,775 A * 3/1973 Takaoka et al. .......... G01S 7/10
348/145
2003/0161501 A1 * 8/2003 Park ......................... F41G 9/02
382/103

(Continued)

FOREIGN PATENT DOCUMENTS

| EP | 2293013 A2 | 3/2011 |
| GB | 2341026 A | 1/2000 |
| WO | 2016138585 A1 | 9/2016 |

OTHER PUBLICATIONS

English translation of International Preliminary Report on Patentability in corresponding International Application No. PCT/AT2017/060015.

(Continued)

*Primary Examiner* — Hovhannes Baghdasaryan
(74) *Attorney, Agent, or Firm* — Hoffmann and Baron, LLP (57) ABSTRACT

The disclosed subject matter relates to a laser scanner for scanning a ground from a seaborne or airborne vehicle, comprising a scanning unit for emitting a fan-shaped scan pattern made of laser beams fanned out about a scan axis and for receiving the laser beams reflected off the ground and an evaluation unit connected to the scanning unit for evaluating the laser beams that are received. The laser scanner is characterized by a measuring unit that is designed to measure the height of the vehicle above ground, and an actuation device that can be anchored to the vehicle and that is connected to the measuring unit. The actuation device is designed to rotate the fan-shaped scan pattern of the scanning unit with respect to the vehicle about a first actuation axis that is different from the scan axis, depending on the measured height above the ground.

19 Claims, 4 Drawing Sheets

(51) Int. Cl.
*G01S 7/48* (2006.01)
*G01S 13/88* (2006.01)
*G01S 17/87* (2020.01)
*G01S 7/497* (2006.01)
*G01S 17/86* (2020.01)
*G01C 7/02* (2006.01)
*G01S 7/481* (2006.01)
*G01S 15/42* (2006.01)
*G01S 15/08* (2006.01)

(52) U.S. Cl.
CPC .......... *G01S 7/4817* (2013.01); *G01S 7/4972* (2013.01); *G01S 13/882* (2013.01); *G01S 15/42* (2013.01); *G01S 17/86* (2020.01); *G01S 17/87* (2013.01); *G01S 17/89* (2013.01); *G01S 15/08* (2013.01)

(56) References Cited

U.S. PATENT DOCUMENTS

| | | | |
|---|---|---|---|
| 2007/0194170 A1* | 8/2007 | Ellison | F16M 11/18 244/3.1 |
| 2009/0122295 A1 | 4/2009 | Eaton | |
| 2009/0185741 A1 | 7/2009 | Nahari et al. | |
| 2013/0088872 A1* | 4/2013 | Ball | G01S 17/89 362/249.01 |
| 2016/0259058 A1* | 9/2016 | Verheggen | G01S 7/4868 |
| 2018/0075643 A1* | 3/2018 | Sequeira | G01S 17/42 |

OTHER PUBLICATIONS

Austrian Office Action dated Sep. 21, 2016.
International Search Report dated May 2, 2017.

* cited by examiner

LASER SCANNER

CROSS-REFERENCE TO RELATED APPLICATIONS

This application is a National Phase application of International Application No. PCT/AT2017/060015 filed Feb. 3, 2017 which claims priority to Austrian Patent Application No. A 50334/2016 filed Apr. 15, 2016, the disclosures of which are incorporated herein by reference.

TECHNICAL FIELD

This disclosed subject matter relates to a laser scanner for scanning a ground from a seaborne or airborne vehicle, comprising a scanning unit for emitting a fan-shaped scan pattern made of laser beams fanned out about a scan axis and for receiving the laser beams reflected off the ground and an evaluation unit connected to the scanning unit for evaluating the laser beams that are received.

BACKGROUND

The prior art discloses putting such a laser scanner on an airplane or a ship to scan the underlying ground as the airplane flies over it or the ship it passes over it, this scanning being done in scanning strips running along the flight path or the navigation path. The strip width of the scanning strip depends on the aperture angle of the fan-shaped scan pattern, i.e., the fan angle, which is usually determined by an optical system, e.g., an oscillating mirror or a continuously rotating polygon mirror wheel, which fans out the laser beams of a single laser source. Alternatively, it is also possible for multiple laser sources to be aligned as a fan-shaped scan pattern. In this way, the overflown or passed-over ground is scanned line by line within each scanning strip.

The laser beams used are, for example, modulated or pulsed laser beams. The time-of-flight of every laser beam from when it is emitted until when its reflection off the ground is received and the emission direction are used to calculate the distance of the ground from the laser scanner in the emission direction, and the many laser beam measurements are used to determine a three-dimensional terrain model of the ground. In order to calculate a terrain model of a larger area, the ground is overflown or passed over multiple times in adjacent paths, and the adjacent scanning strips that are scanned in this way are later assembled by computer.

As the scanning is being performed, if the height of the vehicle above the ground should vary, e.g., as a consequence of the terrain course of the ground, then the width of the scanning strip and simultaneously the scanning resolution correspondingly change for a given fan angle. Since it is difficult or even impossible, depending on the laser scanner used, to change the scanning fan angle, the prior art requires a complicated flight path or route of the scanning vehicle and/or may even require scanning multiple times to achieve the desired scanning resolution and scanning coverage; this often results in substantial areas of overlap of adjacent or crossing scanning strips, which has the consequence of an abrupt change in the scanning resolution at the borders of every overlap area, an overall non-uniform scanning resolution, and high scanning expense.

BRIEF SUMMARY

The disclosed subject matter has the goal of creating a laser scanner that overcomes these disadvantages, in particular one that allows laser scanning from a seaborne or airborne vehicle with uniform, good scanning resolution and coverage, and that allows the selection of simple routes for the scanning vehicle.

This goal is achieved with an inventive laser scanner of the type mentioned at the beginning comprising:

a measuring unit that is designed to measure the height of the vehicle above the ground; and an actuation device configured to be anchored to the vehicle and that is connected to the measuring unit;

wherein the actuation device is designed to rotate the fan-shaped scan pattern of the scanning unit with respect to the vehicle about a first actuation axis that is different from the scan axis, depending on the measured height above the ground.

In this way, given a constant fan angle of the fan-shaped scan pattern, suitable rotation of the fan-shaped scan pattern with respect to the vehicle about the first actuation axis keeps the strip width of the scanning strip constant and the scanning resolution at least approximately unchanged, even if there is a change in the height of the (airborne) vehicle above the ground or, conversely, the depth of the ground beneath the (water-based) vehicle during the laser scanning. For a predefined scanning resolution, this yields a substantially higher surface area during scanning, i.e., a larger scanned surface per unit time. This makes it possible to do without multiple scans and/or overlaps of adjacent scanning strips, and allows selection of very simple, rectilinear flight or navigation routes which nevertheless cover the entire ground to be scanned with largely uniform scanning resolution. For example, the rotation of the fan-shaped scan pattern is selected in such a way that during laser scanning at the lowest height above the ground the fan-shaped scan pattern is approximately transverse to the direction of motion of the vehicle.

The rotation of the fan-shaped scan pattern is especially effective if the first actuation axis is essentially vertical. It is also favorable if the first actuation axis intersects the scan axis at the origin of the fan-shaped scan pattern. In this case, even when the fan-shaped scan pattern is rotated about the first actuation axis, the origin of the fan-shaped scan pattern does not undergo any displacement, which would otherwise additionally have to be taken into consideration when calculating the terrain model.

The measuring unit can be constructed according to different embodiments and variants.

According to a first, especially simple embodiment, the measuring unit is designed to measure the height of the vehicle above ground by measuring the time-of-flight of an emitted measurement beam that has been reflected off the ground and received. This requires no prior knowledge of the ground or its course.

To accomplish this, in one variant a separate measuring unit can be provided, the measurement beam being a radar, laser, or sonar measurement beam. Radar, laser, or sonar distance measuring devices are well-known and proven for many applications, so that a corresponding device that meets the specific requirements can be effectively used in the laser scanner.

In another variant, the measurement beam is one of the laser beams that is emitted by the scanning unit and reflected off the ground and received, e.g., a vertically emitted laser beam. Thus, the scanning unit itself is used as part of the measuring unit to measure the height of the vehicle above the ground; there is no additional, separate device.

According to a second embodiment of the disclosed subject matter, the measuring unit comprises a satellite navigation receiver to measure the three-dimensional position, and the measuring unit is designed to use the position measured by this satellite navigation receiver and a stored terrain model of the ground beneath the vehicle to measure the height of the vehicle above the ground. Seaborne or airborne vehicles scanning the ground usually have such satellite navigation receivers to create points of reference for the scanning. Therefore, this embodiment of the measuring unit can also be realized without special accessories, and can—if a correspondingly precise satellite navigation receiver and a terrain model that is already sufficiently detailed are used—be used even if high requirements are placed on the accuracy of the measured height.

In one variant of this embodiment that uses especially little computing power, said terrain model of the ground is predefined and is stored in a memory of the laser scanner. In most cases at least the rough course of the ground, i.e., at least a rough terrain model, is available anyway, e.g., since such a terrain model was used to plan the scanning. Such a rough terrain model, even merely in tabular or vectorized form, can already be sufficient for the measurement of the height of the vehicle above the ground that is required here. The stored terrain model can then be used in the laser scanner without high computational effort.

Another especially advantageous variant of this embodiment of the measuring unit results if the terrain model created by the evaluation unit of the laser scanner itself is used to determine the height above ground. That is, in this case the evaluation unit is designed to use the emission direction and time-of-flight of the laser beams to calculate said terrain model of the ground and to store it in a memory; the measuring unit has access to this memory. On the one hand, this approach measures the height of the vehicle above the ground very precisely, which can even be done in real time and, if it is desired to increase accuracy, with additional interpolation or extrapolation of the measurements, and on the other hand it does not require any separate prestored terrain model.

In every one of the mentioned embodiments of the disclosed subject matter, the actuation device can further be designed to use the terrain model also to determine a slope of the ground beneath the measured position and transverse to a direction of motion of the vehicle and to rotate the fan-shaped scan pattern of the scanning unit with respect to the vehicle about a second actuation axis that is different from the first one and that lies essentially in the direction of motion, depending on the slope that is determined. This also allows a slope of the ground transverse to the direction of flight or travel to be taken into consideration, to achieve, by suitable rotation about the second actuation axis, a straight course of the scanning strip with constant strip width over the entire flight or navigation path.

According to another advantageous embodiment, the laser scanner has an inertial measurement unit for determining at least one of the values pitch angle, roll angle, and yaw angle, the actuation device being connected to the inertial measurement unit and designed to rotate the fan-shaped scan pattern also to compensate for the determined pitch, roll, and/or yaw angle/s. This makes it possible to compensate for deviations of the vehicle from the horizontal position and direction of motion, e.g., as a consequence of turbulence or crosswind or waves or currents, in one, two, or all three spatial directions.

The actuation device can be implemented designed in different ways. For instance, according to a first advantageous embodiment, the actuation device is designed to rotate the fan-shaped scan pattern of the scanning unit by adjusting a deflection mirror of the scanning unit with respect to the vehicle. This means that the actuation device moves only the small mass of the deflection mirror, and thus can be designed to be small and very dynamic. The deflection mirror can be, on the one hand, a separate mirror of the scanning unit, or, on the other hand, for example, a rotating polygon mirror wheel that is present anyway, whose position and/or rotational axis orientation is adjusted by the actuation device.

In a second embodiment that is an alternative to this, the actuation device is designed to rotate the entire scanning unit with respect to the vehicle. In this variant, the actuation device does not intrude into the laser beam course of the scanning unit, but rather holds the scanning unit, e.g., on a flange or in a holding frame. This simplifies the use of a selfcontained scanning unit, which can, if necessary, be quickly and simply replaced by another scanning unit that has, e.g. a different scanning fan angle.

It is especially favorable if the actuation device comprises a controller and an actuator controlled by the controller to rotate the fan-shaped scan pattern of the scanning unit with respect to the vehicle. In this case, it is more flexible if the controller and actuator are designed to be separate, so that, for example, the control unit can also be designed as a part of the evaluation unit. In the latter case, the required computing power is concentrated in a single unit, the evaluation unit; there is no duplication of computing power, so that the laser scanner can be more compact and economical overall.

BRIEF DESCRIPTION OF THE DRAWINGS

The disclosed subject matter is explained in detail below on the basis of sample embodiments that are illustrated in the attached drawings. The drawings are as follows.

DETAILED DESCRIPTION

Figure 1:
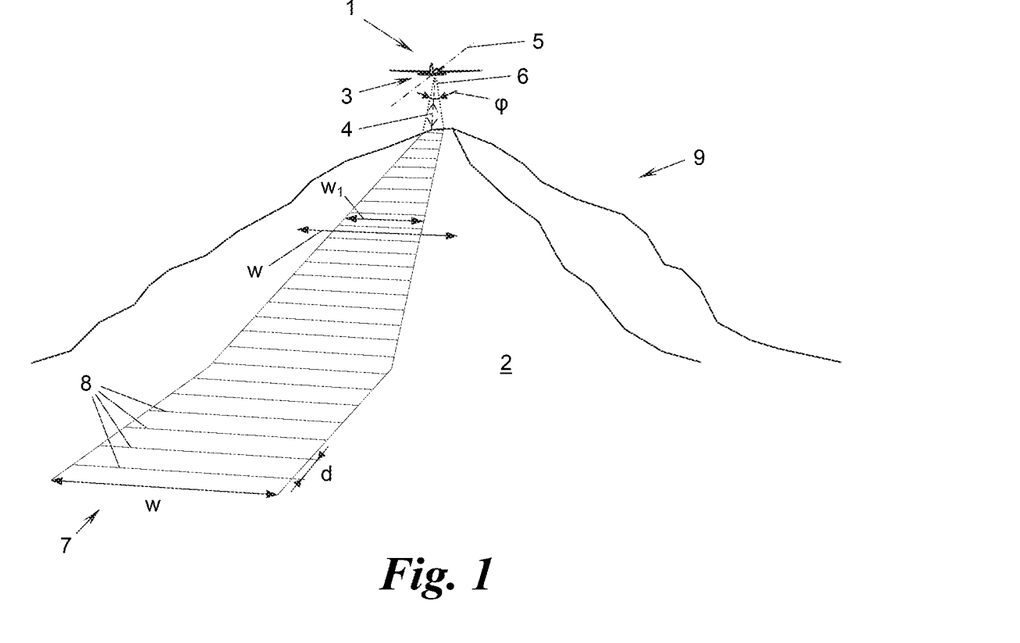
FIG. 1 is a perspective view of an airplane with a laser scanner according to the prior art that is scanning the ground.

According to FIG. 1, a seaborne or airborne vehicle 1, here a manned airplane 1, carries a downward directed laser scanner 3 to scan a ground 2. To accomplish this, the laser scanner 3 produces, e.g., in a single laser source, pulsed or modulated laser beams 4, which an oscillating or rotating optical system, e.g., a continuously rotating polygon mirror wheel, fans out about a scan axis 5 into a fan-shaped scan pattern 6 having a fan angle φ. Alternatively, the laser scanner 3 can have multiple laser sources, which in their totality form the fan-shaped scan pattern 6 by suitable alignment about the scan axis 5. Thus, the fan angle φ is predefined by the structure of the laser scanner 3, and has approximately the shape of a sector of a circle or of a sector of a lateral surface of a cone.

Scanning involves the laser scanner 3 emitting the laser beams 4 onto the overflown ground 2 and receiving the laser beams 4 reflected off the ground 2. To accomplish this, the ground 2 beneath the vehicle 1 is sampled ("scanned") line by line in a scanning strip 7 having the width w with the lines 8 being separated from one another by a distance d. Every line 8 represents the impingement of the laser beams 4 of a fan-shaped scan pattern 6 onto the ground 2; the emission direction and time-of-flight of the laser beams 4 of the multiple lines 8 are used to calculate a three-dimensional terrain model of the ground 2.

The distance d of the lines 8 results as a consequence of the travel of the airplane 1 and the scanning speed; the strip width w depends on the fan angle $\varphi$ and on the height of the airplane 1 above the ground 2 ("above ground level", AGL).

Thus, if the ground 2 comprises a mountain 9, as in the example shown in FIG. 1, the change in strip width w as the mountain 9 is overflown—see, for example, the smaller strip width $w_1$ on the mountain 9 in comparison with the strip width w in the valley—must, according to the prior art, be compensated for, e.g., by suitable selection of the flight path or multiple overflights, to prevent gaps between adjacent scanning strips 7 during scanning. This results in overlaps of adjacent or crossing scanning strips 7 and, consequently, abrupt changes in the scanning resolution at the borders of the overlap areas and an uneven distribution of the scanning resolution over the ground 2.

On the basis of the examples shown in FIG. 2 through 5, the discussion below describes various embodiments of an inventive laser scanner 10 that allows uniform scanning of the ground 2. The same reference numbers are used to designate the same parts as in FIG. 1.

Figure 2:
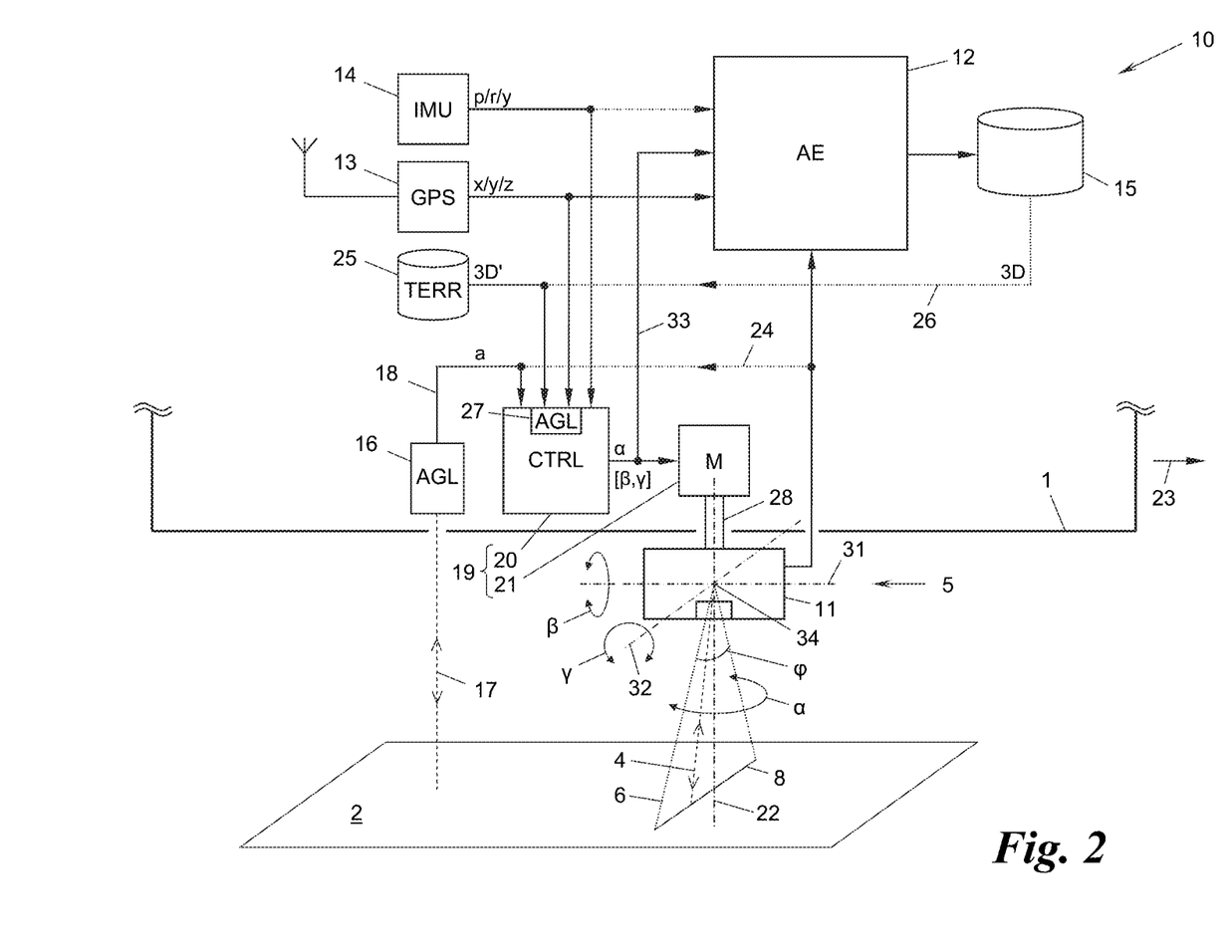
FIG. 2 is a block diagram of a laser scanner according to this disclosed subject matter.

According to FIG. 2, the laser scanner 10 comprises a scanning unit 11, which—comparable with the laser scanner 3 according to FIG. 1—emits the fan-shaped scan pattern 6 of laser beams 4 fanned-out about the scan axis 5 and receives the laser beams 4 reflected off the ground 2. The received laser beams 4 are evaluated by an evaluation unit 12 that is connected to the scanning unit 11. To accomplish this in the simplest case, the evaluation unit 12 takes the emission direction and time-of-flight of the laser beams 4 and also position values x/y/z, which are produced, for example, by a satellite navigation receiver 13 of the laser scanner 10, and, if necessary, the pitch angle p, the roll angle r, and the yaw angle y of the vehicle 1 from an inertial measurement unit (IMU) 14 of the laser scanner 10, and records all of these in a connected memory 15. The memory 15 can be read out, and the recorded values can be used to calculate a three-dimensional terrain model 3D after the scanning, i.e., "offline"; optionally, the terrain model 3D can be calculated by the evaluation unit itself 12 immediately—that is, "online"- and the terrain model 3D can be recorded in memory 15.

As is shown in FIG. 2, the laser scanner 10 comprises a measuring unit 16, which measures the height a of the vehicle 1 above the ground 2. To accomplish this, the measuring unit 16 can use every measurement principle known in the art, e.g., a photogrammetric distance measurement method. In the example shown, the measuring unit 16 emits a measurement beam 17, e.g., a radar, laser, or sonar measurement beam, e.g., vertically downward, and measures its height a (FIG. 4a)—and thus that of the laser scanner 10 or of the vehicle 1—above the ground 2 by measuring the time-of-flight of the measurement beam 17 that has been reflected off the ground 2 and received. Through a wire 18, the measuring unit 16 sends the value of the measured height a to a actuation device 19.

The actuation device 19 comprises a controller 20 and an actuator 21 controlled by this controller 20. The actuation device 19 or its actuator 21 is anchored to vehicle 1 so that it is rigid to movement with respect to the vehicle 1. The controller 20 can optionally be a part of the evaluation unit 12.

The actuation device 19 receives the height a above ground measured by the measuring unit 16, and, depending on this height a, it now rotates the fan-shaped scan pattern 6 of the scanning unit 11 with respect to the vehicle 1 about a first actuation axis 22, which is different from the scan axis 5, by a first actuation angle $\alpha$, i.e., $\alpha=f(a)$. In the example shown in FIG. 2, this first actuation axis 22 is essentially vertical.

Figure 3:
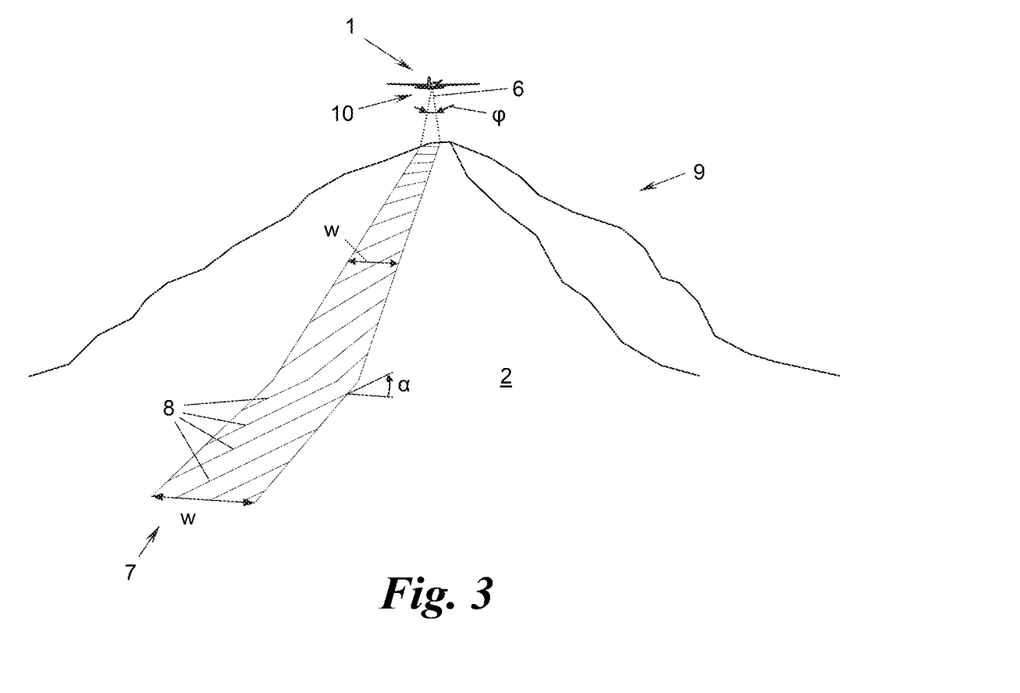
FIG. 3 is a perspective view of an airplane with the laser scanner according to FIG. 2 that is scanning the ground according to FIG. 1.

FIG. 3 illustrates the effect of this rotation: Suitable rotation of the fan-shaped scan pattern 6 about the first actuation axis 22 depending on the height a keeps the strip width w of the scanning strip 7 constant even when the mountain 9 is overflown. This makes it possible to scan the ground 2 with simple, adjacent flight paths or routes, and to do so without gaps and with uniformly good scanning resolution. The scanning strips 7 of constant width w that are produced in this way are substantially simpler to combine for effective calculation of the terrain model 3D than is possible if the same ground 2 is scanned with the laser scanner 3 in FIG. 1.

Figure 4A:
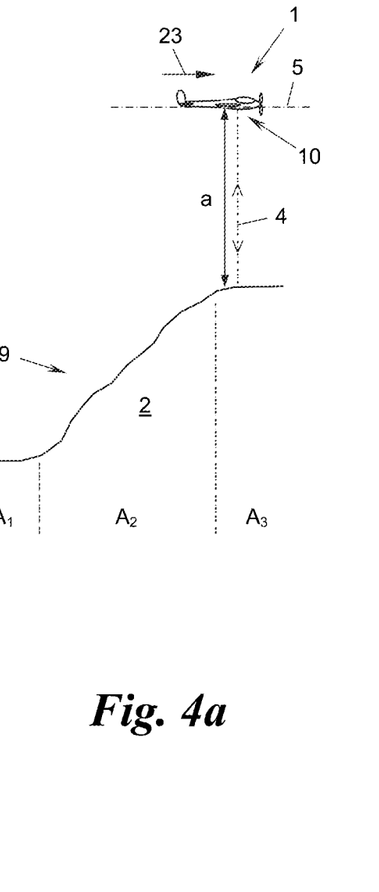
FIG. 4a through 4c show the laser scanner of FIG. 2 while scanning according to FIG. 3, shown in a side view (FIG. 4a), a rear view (FIG. 4b), and a top view (FIG. 4c)
Figure 4B:
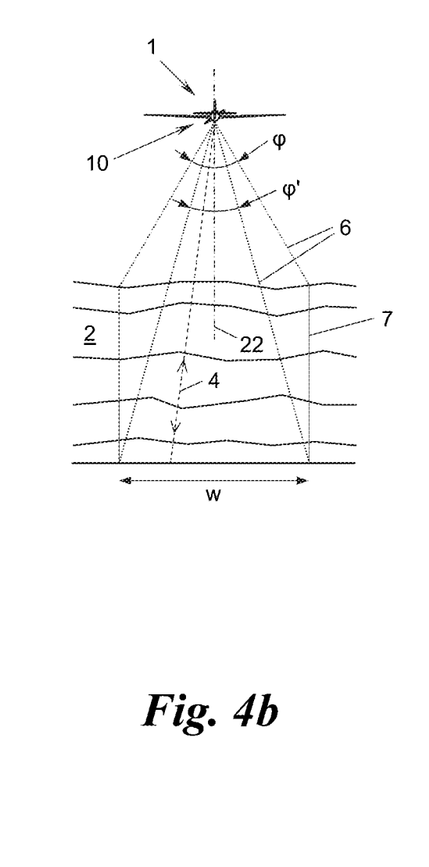
Figure 4C:
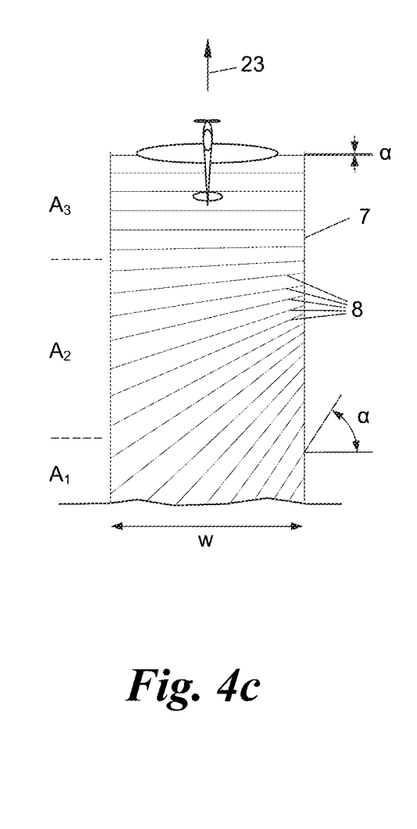

FIG. 4a through 4c show the example of FIG. 3 in detail. The ground 2 beneath the airplane 1 runs, e.g., in a first area $A_1$ approximately at sea level (0 m) and, in a following second area $A_2$, up the mountain 9 to a—highest—third area $A_3$ at 1000 m. The airplane 1 flies in direction of motion 23 over all areas $A_1$-$A_3$ at a constant absolute height of, e.g., 2000 m. Despite the fact that the fan angle $\varphi$ remains the same and despite the change in the height a above the ground 2, the strip width w of the scanning strip 7 remains constant in all areas $A_1$-$A_3$ (see FIGS. 4b and 4c), which is attributable to the height-dependent rotation of the fan-shaped scan pattern 6 about the first actuation axis 22. In the rear view shown in FIG. 4b, the projection $\varphi'$ of the fan angle $\varphi$ changes from a smaller value in the first area $A_1$ ($\alpha \gg 0$, e.g., $\alpha=60°$) to the full fan angle $\varphi$ at the lowest height a above ground in the third area $A_3$ ($\alpha=0$), without the real fan angle $\varphi$ ever needing to be changed; the top view of FIG. 4c illustrates this. In the third area $A_3$ ($\alpha=0$) the scan axis 5 is aligned, e.g., directly in the direction of motion 23 of the airplane 1.

Returning to FIG. 2, the measuring unit 16 can be designed not only as a separate, stand-alone unit, but rather also in one of the following alternative types; the laser scanner 10 could possibly even have more than one of these alternatives and select the one which is most suitable for measuring the height a or combine the measurement results of multiple alternatives.

According to one of these alternative variants, the measuring unit is formed by the scanning unit 11 itself, i.e., its measurement beam is one of the laser beams 4 emitted by the scanning unit 11 and reflected off the ground and received, e.g., a laser beam 4 emitted vertically downward. The controller 20 of the actuation device 19 can receive this information of the scanning unit 11 through a wire 24. If necessary, evaluation of the information, e.g., by the evaluation unit 12, can be interposed, so that in this variant the scanning unit 11—optionally together with the evaluation unit 12—forms the measuring unit.

According to another alternative variant, the measuring unit comprises the satellite navigation receiver 13, which measures its three-dimensional position x/y/z, and thus the position of the laser scanner 10 or of the vehicle 1. With the help of the position x/y/z measured by the satellite navigation receiver 13 and a stored terrain model 3D' of the ground 2 beneath the vehicle 1, the height a of the vehicle 1 above the ground is then determined.

For this purpose it is possible to use, on the one hand, a fixed predefined terrain model 3D' of the ground 2, this terrain model 3D' being stored in a memory 25 of the laser scanner 10. It can be, e.g., a rough model of the ground 2 used for planning the scanning process, such as is commercially available in the form of a terrain model, e.g., from suppliers of navigation maps.

On the other hand, in the case described further above in which the evaluation unit 12 itself calculates the terrain model 3D as the received laser beams 4 are evaluated ("online"), this calculated terrain model 3D can be used as the terrain model 3D' for determining the height a, see data line 26.

Each of the calculation steps required for measuring the height a from the position data x/y/z of the satellite navigation receiver 13 and the terrain model 3D' can be carried out in its own functional block 27, which, however, can also be part of the controller 20 or even of the evaluation unit 12. That is, in these cases the measuring unit is formed by the satellite navigation receiver 13, the memory 25 or 15 with the terrain model 3D' or 3D, and the functional block 27.

As is shown in FIG. 2, the actuation device 19 can carry the entire scanning unit 11 on a movable arm 28 and rotate it with respect to the vehicle 1. Alternatively, the scanning unit 11 is pivotably mounted on the vehicle 1 or on a housing part of the laser scanner 10, and is merely rotated by the actuation device 19. According to another alternative embodiment, the actuation device 19 rotates the fan-shaped scan pattern 6 of the scanning unit 11 merely by adjusting a deflection mirror of the scanning unit 11 with respect to the vehicle 1. The deflection mirror can be inside or outside a housing of the scanning unit 11.

Figure 5A:
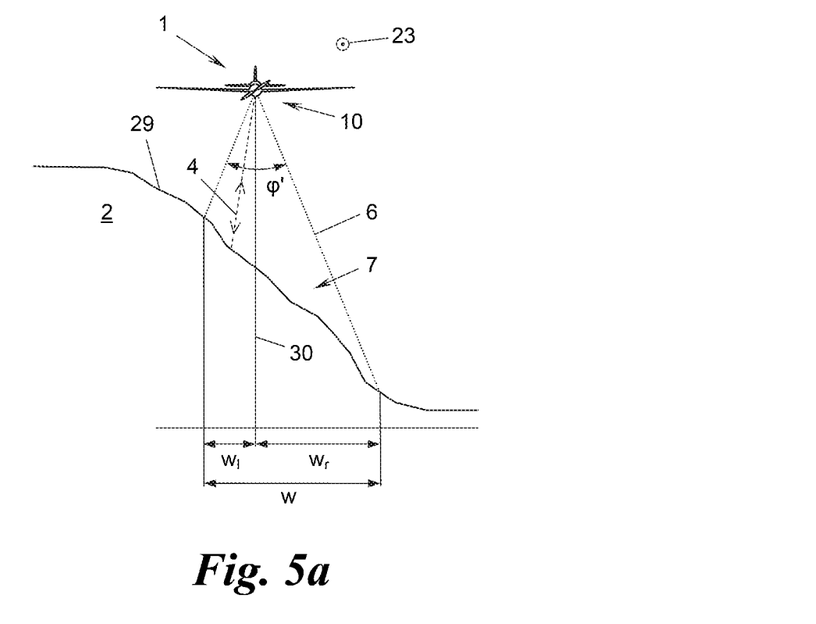
FIGS. 5a and 5b show the laser scanner of FIG. 2 while scanning a ground with a slope transverse to the direction of flight, without slope compensation (FIG. 5a) and with slope compensation (FIG. 5b), each in a front view.
Figure 5B:
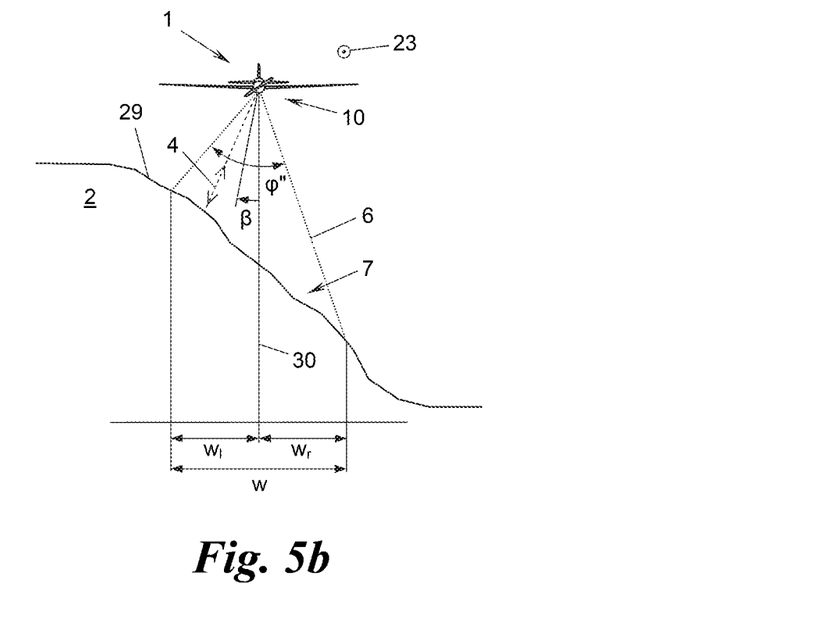

FIGS. 5a and 5b show another possible way of adjusting the laser scanner 10 or its fan-shaped scan pattern 6 depending on the terrain course of the ground 2. The airplane 1 overflies a slope 29 in the ground 2 inclined transverse to the direction of motion 23 of the airplane 1. As is shown in FIG. 5a, this produces an asymmetric position of the scanning strip 7 with respect to the vertical line 30 under the airplane 1 (see the sections $w_l$ and $w_r$ of the scanning strip 7), which also displaces the scanning strip in the direction transverse to the direction of motion 23.

To counteract this, the actuation device 19 according to FIG. 5b is designed to use the terrain model 3D' to determine the slope 29 of the ground 2 beneath the measured position x/y/z and transverse to the direction of motion 23 of the airplane 1. After that, the actuation device 19 rotates the fan-shaped scan pattern 6 of the scanning unit 11 with respect to the airplane 1 by a second actuation angle β, depending on the determined slope 29, about a second actuation axis 31 (FIG. 2) lying essentially in the direction of motion 23 (normal to the plane of the drawing of FIG. 5), to center the scanning strip 7 with respect to the vertical line 30. As is shown in FIG. 2, the second actuation axis 31 can coincide with the scan axis 5.

In another optional embodiment, the pitch, roll, and/or yaw angles p, r, and y of the airplane 1 measured by the inertial measurement unit 14 of the laser scanner 10 can also be used to rotate the fan-shaped scan pattern 6 to compensate for at least one of these angles. The rotation about the first actuation axis 22 or the angle α can be used to compensate for the yaw angle y, that about the second actuation axis 31 (angle β) can be used to compensate for the roll angle r, and that about a third actuation axis 32 (angle γ) can be used to compensate for the pitch angle p.

It goes without saying that in every embodiment the actuation device 19 sends the actuation angle/s α and, if present, β and γ through a corresponding wire 33 to the evaluation unit 12, and the evaluation unit 12 takes these angles α, β, γ into consideration in the determination of the emission directions of the laser beams 4, to create the terrain model 3D correctly.

To make it simpler for the evaluation unit 12 to take into consideration the rotation of the fan-shaped scan pattern 6, the first actuation axis 22 and—if desired and present—also the second and/or the third actuation axes 31, 32 can intersect the scan axis 5 at the origin 34 of the fan-shaped scan pattern 6.

The laser scanner 10 can be used from an airborne vehicle 1 both to scan a terrain and also to scan the floor of a body of water. To scan the floor of a body of water, the laser scanner 10 can be used in the same way on a suitable seaborne vehicle, i.e., a ship or submarine. Optionally, the vehicle 1 is unmanned, i.e., an unmanned aerial vehicle (UAV), unmanned surface vehicle (USV), or unmanned underwater vehicle (UUV).

The disclosed subject matter is not limited to the presented embodiments, but rather comprises all variants, modifications, and combinations that fall within the scope of the associated claims.

What is claimed is:

1. A laser scanner for scanning a ground from a seaborne or airborne vehicle, comprising
   a scanning unit configured for emitting a fan-shaped scan pattern made of laser beams fanned out over a fan angle about a scan axis to scan the ground beneath the vehicle in a scanning strip running along a path of the vehicle, and for receiving the laser beams reflected off the ground,
   an evaluation unit connected to the scanning unit and configured for evaluating the laser beams that are received,
   a measuring unit configured to measure the height of the vehicle above the ground, and
   an actuation device connected to the measuring unit and configured to be anchored to the vehicle,
   wherein the actuation device is configured to rotate the fan-shaped scan pattern of the scanning unit with respect to the vehicle about a first actuation axis by a first actuation angle without changing the fan angle, and wherein the first actuation axis is different from the scan axis and stationary in relation to the vehicle when the actuation device is anchored to the vehicle, and which first actuation angle depends on the measured height above the ground so that a strip width of the scanning strip remains substantially constant during scanning.

2. The laser scanner according to claim 1, wherein the first actuation axis is essentially vertical.

3. The laser scanner according to claim 1, wherein the first actuation axis intersects the scan axis at an origin of the fan-shaped scan pattern.

4. The laser scanner according to claim 1, wherein the measuring unit is configured to measure the height of the vehicle above ground by measuring the time-of-flight of an emitted measurement beam that has been reflected off the ground and received.

5. The laser scanner according to claim 4, wherein the measurement beam is a radar, laser, or sonar measurement beam.

6. The laser scanner according to claim 4, wherein the measurement beam is one of the laser beams that is emitted by the scanning unit and reflected off the ground and received.

7. The laser scanner according to claim 1, wherein the measuring unit has a satellite navigation receiver to measure the three-dimensional position, and wherein the measuring unit is configured to use the position measured by this satellite navigation receiver and a stored terrain model of the ground beneath the vehicle to measure the height of the vehicle above the ground.

8. The laser scanner according to claim 7, wherein said terrain model of the ground is predefined and stored in a memory of the laser scanner.

9. The laser scanner according to claim 7, wherein the evaluation unit is configured to use the direction and time-of-flight of the received laser beams to calculate said terrain model of the ground and to store it in a memory to which the measuring unit has access.

10. The laser scanner according to claim 7, wherein the actuation device is further configured to use the terrain model to determine a slope of the ground beneath the measured position and transverse to a direction of motion of the vehicle and to rotate the fan-shaped scan pattern of the scanning unit with respect to the vehicle about a second actuation axis that is different from the first one and that lies essentially in the direction of motion, depending on the slope that is determined.

11. The laser scanner according to claim 1, further comprising an inertial measurement unit for determining at least one of the values pitch angle, roll angle, and yaw angle, the actuation device being connected to the inertial measurement unit and configured to rotate the fan-shaped scan pattern also to compensate for the determined pitch, roll, and/or yaw angle/s.

12. The laser scanner according to claim 1, wherein the actuation device is configured to rotate the fan-shaped scan pattern of the scanning unit by adjusting a deflection mirror of the scanning unit with respect to the vehicle.

13. The laser scanner according to claim 1, wherein the actuation device is configured to rotate the entire scanning unit with respect to the vehicle.

14. The laser scanner according to claim 1, wherein the actuation device comprises a controller and an actuator controlled by the controller to rotate the fan-shaped scan pattern of the scanning unit with respect to the vehicle.

15. The laser scanner according to claim 14, wherein the controller is part of the evaluation unit.

16. The laser scanner according to claim 6, wherein said one of the laser beams that is emitted by the scanning unit and reflected off the ground and received is a vertically emitted laser beam.

17. A laser scanner for scanning a ground from a seaborne or airborne vehicle, comprising
   a scanner which emits a fan-shaped scan pattern made of laser beams fanned out over a fan angle about a scan axis to scan the ground beneath the vehicle in a scanning strip running along a path of the vehicle, and for receiving the laser beams reflected off the ground,
   an evaluator connected to the scanner which evaluates the laser beams that are received,
   means for measuring the height of the vehicle above the ground, and
   an actuator controlled by a controller, the actuator being anchored to the vehicle, the controller connected to the measuring means to receive the measured height of the vehicle above the ground,
   wherein the actuator rotates the fan-shaped scan pattern of the scanner with respect to the vehicle about a first actuation axis by a first actuation angle without changing the fan angle, and wherein the first actuation axis is different from the scan axis and stationary in relation to the vehicle due to the actuator being anchored to the vehicle, and which first actuation angle depends on the measured height above the ground so that a strip width of the scanning strip remains substantially constant during scanning.

18. The laser scanner according the claim 17, wherein the means for measuring the height of the vehicle above the ground includes emitting a measurement beam and measuring the time-of-flight of the measurement beam that has been reflected off the ground and received.

19. The laser scanner according to claim 17, wherein the means for measuring the height of the vehicle above the ground includes a satellite navigation receiver which measures a three-dimensional position, and wherein the three-dimensional position and a terrain model of the ground beneath the vehicle stored in a memory of the laser scanner are used to measure the height of the vehicle above the ground.

* * * * *